June 27, 1961                F. J. BUTTER                 2,990,209
                           LATCH MECHANISM
Filed Jan. 14, 1959                                    2 Sheets-Sheet 1
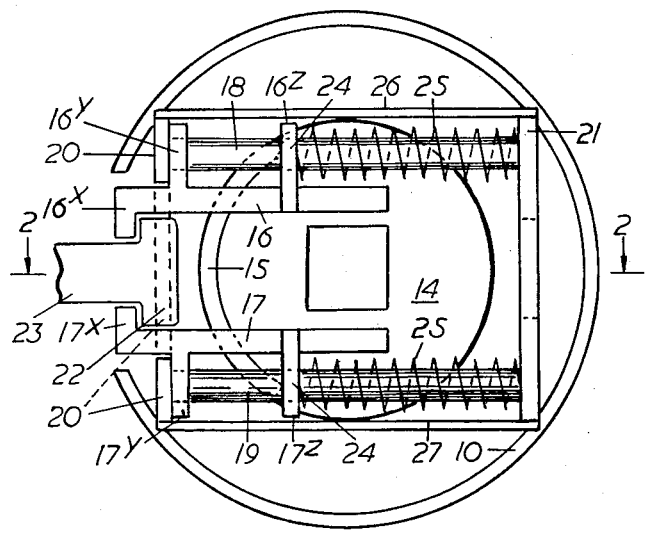
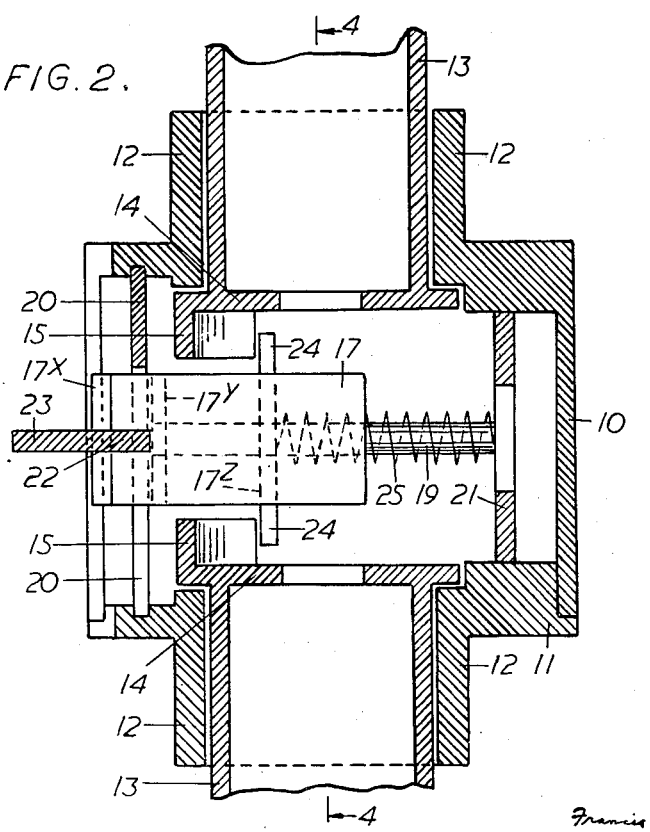
Inventor
Francis J. Butter
By Scrivener and Parker,
                                          Attorneys June 27, 1961   F. J. BUTTER   2,990,209
LATCH MECHANISM
Filed Jan. 14, 1959   2 Sheets-Sheet 2

Inventor
Francis J. Butter
By Scrivener and Parker,
Attorneys

United States Patent Office 2,990,209
Patented June 27, 1961

2,990,209
LATCH MECHANISM
Francis J. Butter, Finchfield, Wolverhampton, England, assignor to Josiah Parkes & Sons Limited, Willenhall, Staffordshire, England
Filed Jan. 14, 1959, Ser. No. 786,714
Claims priority, application Great Britain Jan. 3, 1958
6 Claims. (Cl. 292—169)

This invention relates to locks and latches for doors and of the cylindrical type, that is to say of the type in which the spring bolt of a separate tubular latch, fitted in a hole which is bored into the door from and at right angles to its shutting edge and runs radially into another and usually larger hole bored through the thickness of the door, is operable by a spring-loaded retractor which can be actuated by either of two rollbacks associated with knobs on opposite sides of the door, the retractor and the rollbacks on the inner ends of the knob shanks being accommodated in a case, usually cylindrical or nearly so, which is fitted in said other or larger hole and usually has axial tubular end extensions affording or fitted with bearings in which said rollbacks are mounted for rotation by the knobs.

In locks or latches of this so-called cylindrical type as usually constructed, the rollbacks are of segmental form and operate, as followers, upon forwardly presented bearing faces on the retractor for withdrawing it against its spring-loading, and with it the spring bolt of the latch, when either of the handles or knobs is turned in either direction, said retractor being guided for free fore-and-aft movement in fixed guides at either side and having at its forward end vertically opposed claw-like members which take over the extremities of a cross bar or T-shaped rear end of the spring bolt lath or tail. Thus the retractor has been bodily movable by either rollback in either direction of rotation, that is to say the retractor will draw back the spring bolt irrespective of the direction of rotation imparted to either knob used to operate it.

In a lock of the type referred to and according to the present invention, the retractor instead of being bodily movable, as a unitary structure, by either rollback in either direction of rotation, comprises separate upper and lower independently operable parts or halves each guided for free fore-and-aft rectilinear movement and each being adapted to withdraw the spring bolt independently, one half or part retractor being operable by either rollback in one direction of rotation only and the other half or part retractor being operable by either rollback in the opposite direction of rotation only.

With this arrangement, the mass to be moved against the spring loading is reduced, the ineffective half or part retractor in any bolt withdrawal operation remaining stationary, so that the action is correspondingly easier.

In order that the invention may be clearly understood, it will now be more fully described with reference to the embodiment shown in the accompanying drawings, wherein:

FIG. 1 is an end elevation of the retractor unit for operating the spring bolt of a separate tubular latch, the closure or "cap side" of the cylindrical casing having been removed, with one of the rollbacks, so as to show the retractor mechanism more clearly.

FIG. 2 is a sectional plan of the retractor unit, the section being taken on the line 2—2 of FIG. 1.

Figure 3:
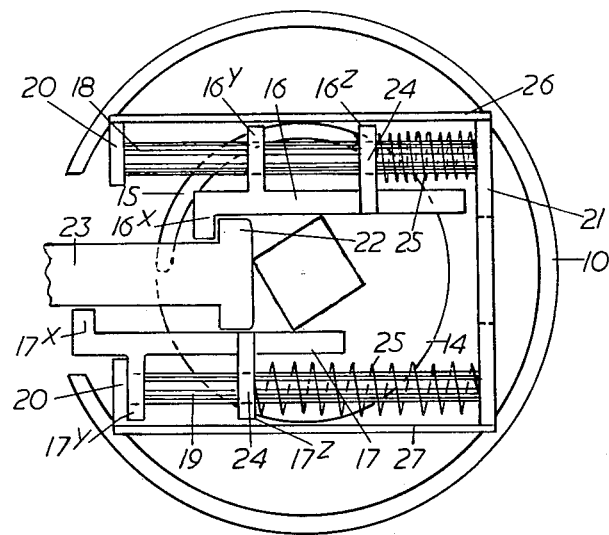
FIG. 3 is a similar view to FIG. 1, but shows the spring bolt of the separate tubular latch withdrawn by one of the independently operable parts or halves of the retractor.

Referring to the drawings, the cylindrical casing of the retractor unit comprises a cylindrical cup-shaped part or "case side" 10 and a disc-like part or "cap side" 11, and both of these parts have axial tubular extensions 12 which afford rotational bearings for tubular spindles 13 of the two rollbacks 14 which are in the form of discs with segmental rim flanges 15. The spindles 13 extend outwardly from the tubular extensions or bearings 12 for mounting and operative connection to the shanks of the respective knobs (not shown) on opposite sides of the door.

Figure 4:
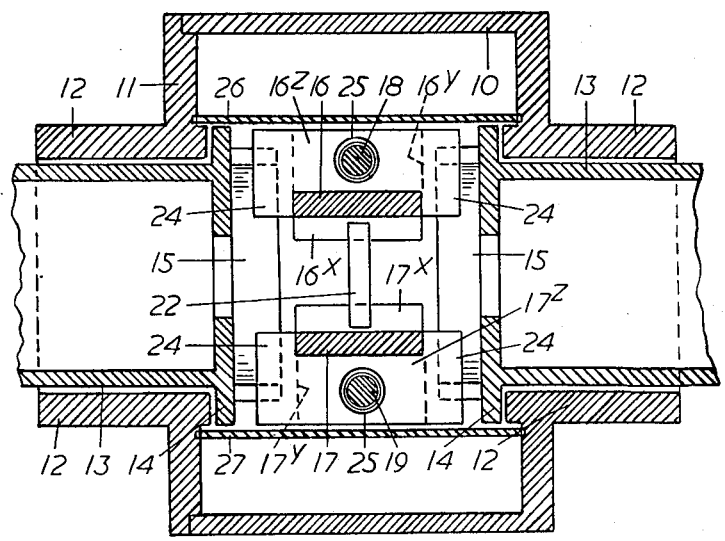
FIG. 4 is a sectional elevation of the retractor unit, the section being taken on the line 4—4 of FIG. 2.

The retractor comprises upper and lower independently operable parts or identically similar halves 16, 17, which are guided for free fore-and-aft rectilinear movement on parallel guide rods 18, 19 respectively which are fixed in end plates 20, 21 and form therewith a rectangular frame, as seen more particularly in FIGS. 1 and 3. The retractor parts or halves 16, 17 are formed with confronting claw or hook-like portions, $16^x$, $17^x$ respectively, at their forward ends which engage the extremities of a T-head 22 on the bolt tail 23 of the separate latch and said retractor parts or halves 16, 17 are formed each with two longitudinally spaced transverse flanges, $16^y$, $16^z$ and $17^y$, $17^z$ respectively which are formed centrally with holes affording sliding bearings on the parallel guide rods 18, 19 respectively, whilst the rearmost flanges $16^z$, $17^z$ extend laterally to afford wing-like abutments 24 which project into the paths of rotation of the ends of the segmental rim flanges 15 of the rollbacks 14 (see more particularly FIGS. 2 and 4). Sleeved upon the guide rods 18, 19 are helical compression springs 25 which operate between the rear plate 21 and the respective flanges $16^z$, $17^z$ of the retractor parts or halves 16, 17 so as normally to retain the latter in the positions shown in FIG. 1 with the respective flanges $16^y$, $17^y$ bearing forwardly against the forward plate 20 and with the wing-like abutments 24 engaging or closely confronting the opposite ends of the segmental rim flanges 15 of the rollbacks 14. The side edges of the front plate 20 are engaged with vertical grooves in the "case side" 10 and the "cap side" 11 (see FIG. 2) and the top and bottom edges of the front and rear plates 20, 21 are engaged in V-shaped grooves formed in the cylindrical wall of the "case side 10 (see FIGS. 1 and 5), which V-shaped grooves also accommodate the end edges of top and bottom plates 26, 27, respectively, the longitudinal or side edges of which engage in horizontal grooves in the "case side" 10 and the "cap side" 11 (see FIG. 4). These top and bottom plates 26, 27 are disposed just clear of the rollbacks 15 and of the top and bottom edges respectively of the transverse flanges $16^y$, $16^z$ and $17^y$, $17^z$ of the retractor parts or halves 16, 17 and serve to prevent the latter from turning to any appreciable extent about their guide rods 18, 19.

The assembly constituted by the front and rear plates 20, 21, guide rods 18, 19, and the retractor parts or halves 16, 17 with their loading springs 25 is passed laterally into position in the "case side" 10 and between the top and bottom plate 26, 27 before the "cap side" 11, with its rollback 15, is secured in position by any appropriate fixing means, and, as is usual, the forward part of the "case side" is gapped to enable the retractor claws or hook-like portions $16^x$, $17^x$ to be engaged in front of the T-head 22 of the bolt tail 23 as the said assembly is passed into position, and also to afford operating clearances for these parts.

As will be seen from FIG. 3, clockwise rotation of the rollback 15 which is mounted in the "case side" 10 has the effect of moving the retractor part or half rearwardly against its spring-loading to withdraw the latch bolt, and, obviously clockwise rotation of the rollback 15 mounted in the "cap side" 11 will have precisely the same effect, the retractor part or half 17 in either of these events remaining in its normal position. Conversely, rotation of either rollback 15 from the normal position in an anti-clockwise direction will cause the retractor part or half 17 to withdraw the latch bolt without affecting the retractor part or half 16 in any way.

By dividing the retractor into two separate and independently operable parts or halves either of which can be actuated by either rollback to withdraw the latch bolt, the mass to be moved against the spring-loading in any bolt withdrawal operation is reduced and the action is correspondingly easier.

In order to minimise tilting and binding of the retractor parts or halves on their guide rods, and also to reduce wear, said rods are preferably disposed in, or approximately in, the lines of pressure exerted by the respective rollbacks upon the retractor parts or halves.

Having fully described my invention, what I claim and desire to secure by Letters Patent is:

1. A latch operating mechanism having a housing, a retractor in said housing for moving a latch and a pair of rollbacks in said housing for operating said retractor, said retractor comprising separate upper and lower independently operable parts each engaging said latch, one retractor part being operable by either rollback in one direction of rotation only and the other retractor part being operable by either rollback in the opposite direction of rotation only, and separate guide means respectively positioned substantially in the line of the application of pressure of the respective roll backs for respectively guiding said parts for free fore-and-aft rectilinear movement.

2. A latch mechanism as claimed in claim 1, wherein the two parts of the retractor are alike, each having a latch engaging portion at its forward end and being formed with laterally spaced wings which afford forwardly presented bearing faces for the rollbacks.

3. A latch mechanism as claimed in claim 2, wherein the retractor parts are mounted for free fore-and-aft movement on fixed guide rods which pass through bearing holes in transverse flanges on said retractor parts, and in which the laterally spaced wings on each retractor part are afforded by the opposite end portions of the rearmost of said transverse flanges.

4. A latch mechanism according to claim 3, wherein said guide rods, one for each retractor part are carried by front and rear plates which, with said guide rods, and the retractor parts mounted thereon, constitute an assembly which can be passed laterally into position in the housing.

5. A latch mechanism according to claim 4, wherein helical compression springs sleeved upon the guide rods and operating between the rear plate and the rearmost transverse flanges on the retractor parts normally maintain the latter in forward positions with their foremost transverse flanges bearing against the front plate and with the laterally spaced wings on their rearmost transverse flanges engaging the opposite ends of segmental rim flanges on the rollbacks.

6. A latch mechanism according to claim 5, wherein locating means are provided in the housing as to prevent the retractor parts turning to any appreciable extent about their respective guide rods.

References Cited in the file of this patent

UNITED STATES PATENTS

| | | |
|---|---|---|
| 1,865,128 | McKinney | June 28, 1932 |
| 1,937,930 | Woernle | Dec. 5, 1933 |
| 2,314,488 | Fellows | Mar. 23, 1943 |
| 2,351,077 | Segal | June 13, 1944 |
| 2,817,553 | Butter | Dec. 24, 1957 |
| 2,879,096 | McConnell | Mar. 24, 1959 |